(12) United States Patent
Remis et al.

(10) Patent No.: US 10,168,753 B2
(45) Date of Patent: Jan. 1, 2019

(54) POWER DELIVERY OPTIMIZATION BASED ON SYSTEM CAPABILITY

(71) Applicant: LENOVO Enterprise Solutions (Singapore) PTE. LTD., New Tech Park (SG)

(72) Inventors: Luke Remis, Raleigh, NC (US); Brian Christopher Totten, Durham, NC (US); Jamaica Laquay Barnette, Durham, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 108 days.

(21) Appl. No.: 15/295,894

(22) Filed: Oct. 17, 2016

(65) Prior Publication Data

US 2018/0107258 A1  Apr. 19, 2018

(51) Int. Cl.
*G06F 1/26* (2006.01)
*G06F 8/65* (2018.01)

(52) U.S. Cl.
CPC . *G06F 1/26* (2013.01); *G06F 8/65* (2013.01)

(58) Field of Classification Search
CPC .......................................................... G06F 1/26
See application file for complete search history.

(56) References Cited

U.S. PATENT DOCUMENTS

2009/0256537 A1\* 10/2009 Sato .................... H02M 3/1584
323/272

FOREIGN PATENT DOCUMENTS

CN          106293789 A  \*  1/2017

\* cited by examiner

*Primary Examiner* — Albert Wang
(74) *Attorney, Agent, or Firm* — Kunzler, PC

(57) ABSTRACT

An apparatus for voltage regulation device adjustment includes a configuration module that determines a configuration of an electronic device, where determining the configuration includes determining which components are installed and information about the installed components. The electronic device includes a voltage regulator device ("VRD") providing power to one or more of the components. The apparatus includes an environment module that measures one or more environmental variables relating to an operating environment of the electronic device. The apparatus includes a firmware selection module that selects new firmware for the VRD of the electronic device in response to the determined configuration and measured environmental variables, and a firmware update module that replaces previously installed firmware on the VRD with the new firmware. The new firmware includes control settings for the VRD.

20 Claims, 5 Drawing Sheets

POWER DELIVERY OPTIMIZATION BASED ON SYSTEM CAPABILITY

FIELD

The subject matter disclosed herein relates to voltage regulation devices and more particularly relates to optimizing power delivery based on system capabilities by updating firmware of voltage regulation devices within a system.

BACKGROUND

Computers, smartphones, data center equipment, consumer electronics, and other equipment typically are powered using a voltage regulation device ("VRD") that converts voltage from a utility, a generator, a battery pack, solar panels, or other source to another voltage. Often, alternating current ("AC") voltage is converted to direct current ("DC") voltage to be used for powering electronic components on an electronic device. For example, a central processing unit ("CPU") often demands various DC voltages that are very low compared to distribution voltages in power lines leading to the electronic device.

When an electronic device is shipped from a factory, the electronic device may be modified to add components, such as memory, peripheral devices, storage devices, CPUs, etc. However, the manufacturer often plans for the worst case scenario where all of the electronic device is populated with components or when the components are operating at a peak value. Typically, VRDs include switchmode power converters that include switches, inductors, capacitors, etc. that operate on a fixed or variable duty cycle to convert an input voltage to a regulated output voltage. Typical switchmode power converters are often less efficient at light load. In addition, some VRDs include multiple phases wired in parallel that each can produce power to contribute to a load. The settings for a VRD, which are often included in VRD firmware, from the factory for worst case conditions may not be as efficient as when the electronic device has an actual configuration with less than the full complement of components.

BRIEF SUMMARY

An apparatus for voltage regulation device adjustment is disclosed. A method and computer program product also perform the functions of the apparatus. The apparatus includes a configuration module that determines a configuration of an electronic device, where determining the configuration includes determining which components are installed and information about the installed components. The electronic device includes a voltage regulator device ("VRD") providing power to one or more of the components. The apparatus includes an environment module that measures one or more environmental variables relating to an operating environment of the electronic device. The apparatus includes a firmware selection module that selects new firmware for the VRD of the electronic device in response to the determined configuration and measured environmental variables, and a firmware update module that replaces previously installed firmware on the VRD with the new firmware. The new firmware includes control settings for the VRD.

In one embodiment, the components of the electronic device include one or more of a particular component and the components include one or more of a central processing unit ("CPU"), a programmable hardware device, a memory device, a non-volatile storage device, a peripheral device, and a computer bus connected device. In another embodiment, determining the configuration of the electronic device includes determining a model number of a component and information relating to the model of the component. In another embodiment, the one or more environmental variables include temperature of a component, ambient temperature within the electronic device, ambient temperature external to the electronic device, humidity, and/or air velocity through the electronic device. In another embodiment, an application module that determines an application running on the electronic device and one or more effects of the application on the one or more components of the electronic device.

In one embodiment, the previously installed firmware on the VRD includes firmware installed prior to shipment from a manufacturer. In another embodiment, the new firmware adjusts settings within the VRD. In another embodiment, the settings within the VRD include an output voltage setpoint, a current setpoint, a control parameter, a parameter of a component within the VRD, and/or a switching parameter. In another embodiment, the settings within the VRD include selection of one or more phases of the VRD for operation. The one or more phases include power units connected in parallel, where each power unit provides power from the VRD when selected.

In one embodiment, the VRD is connected to a management bus and receives the new firmware over the new firmware over the management bus. In another embodiment, the management bus is connected to a baseboard management controller ("BMC") associated with the electronic device. In another embodiment, the BMC is connected to a computer network external to the electronic device and the BMC receives VRD firmware information over the computer network. In another embodiment, the management bus includes one of a serial bus, an Inter-Integrated Circuit ("I²C") bus, a Serial Peripheral ("SPI") bus, a Controller Area Network ("CAN") bus, an ACCESS.bus, a System Management Bus ("SMBus"), a Power Management Bus ("PMBus"), and an Intelligent Platform Management Bus ("IPMB"). In another embodiment, the apparatus includes the electronic device.

A method for voltage regulation device adjustment includes determining a configuration of an electronic device, where determining the configuration includes determining which components are installed and information about the installed components. The electronic device includes a VRD providing power to one or more of the components. The method includes measuring one or more environmental variables relating to an operating environment of the electronic device, selecting new firmware for the VRD of the electronic device in response to the determined configuration and measured environmental variables, and replacing previously installed firmware on the VRD with the new firmware, wherein the new firmware includes control settings for the VRD.

In one embodiment, the method includes determining an application running on the electronic device and one or more effects of the application on the one or more components of the electronic device. In another embodiment, the components of the electronic device include one or more of a particular component and the components include a central processing unit ("CPU"), a programmable hardware device, a memory device, a non-volatile storage device, a peripheral device, and/or a computer bus connected device and determining the configuration of the electronic device includes determining a model number of a component and information relating to the model of the component. In another embodiment, the one or more environmental variables include temperature of a component, ambient temperature within the electronic device, ambient temperature external to the electronic device, humidity, and/or air velocity through the electronic device. In another embodiment, the new firmware adjusts settings within the VRD, the settings within the VRD include an output voltage setpoint, a current setpoint, a parameter of a component within the VRD, a switching parameter, and/or selection of one or more phases of the VRD for operation. The one or more phases include power units connected in parallel, where each power unit provides power from the VRD when selected.

A computer program product for voltage regulation device adjustment including a computer readable storage medium having program instructions embodied therewith. The program instructions executable by a processor to cause the processor to determine a configuration of an electronic device, where determining the configuration includes determining which components are installed and information about the installed components. The electronic device includes a voltage regulator device ("VRD") providing power to one or more of the components.

The program instructions executable by a processor to cause the processor to measure one or more environmental variables relating to an operating environment of the electronic device, select new firmware for the VRD of the electronic device in response to the determined configuration and measured environmental variables, and replace previously installed firmware on the VRD with the new firmware, wherein the new firmware includes control settings for the VRD.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
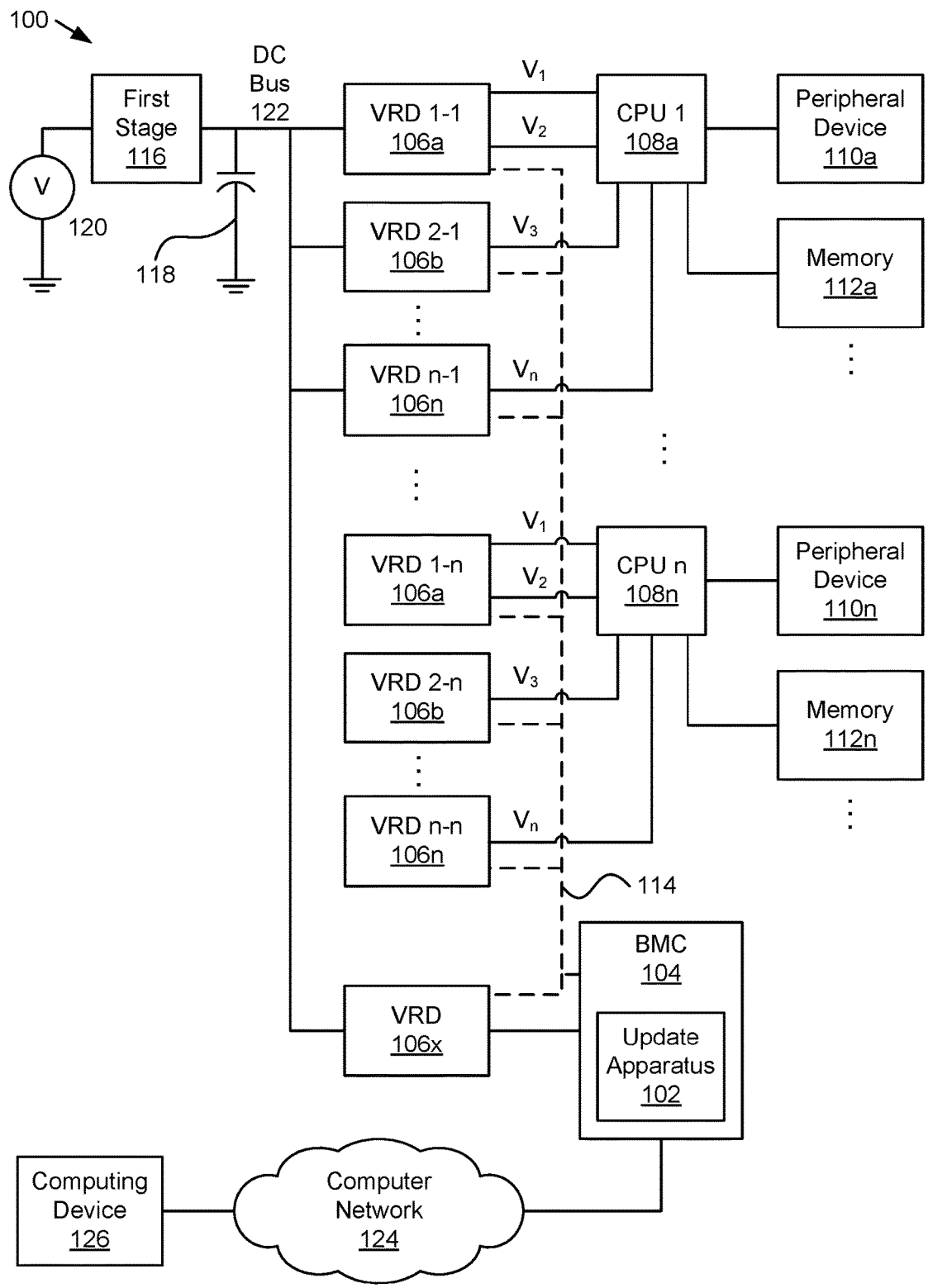
FIG. 1 is a schematic block diagram illustrating one embodiment of a system for voltage regulation device adjustment.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for voltage regulation device adjustment. The system 100 includes an update apparatus 102 in a baseboard management controller ("BMC"), voltage regulation devices ("VRDs") 106a1-106na, a peripheral device 110a, and memory 112a associated with a first central processing unit ("CPU") 1 108a, VRDs 106an-106nn, a peripheral device 110n, and memory 112n associated with an nth central processing unit ("CPU") n 108n, a VRD 106x associated with the BMC 104, a management bus 114, a first stage 116, a capacitor 118, a voltage source 120, a direct current ("DC") bus 122, a computer network 124 and a computing device 126, which are described below.

The VRDs 106a1-n1 to 106an-nn (collectively or generically and in any configuration "106"), CPUs 108a-n (collectively "108"), peripheral devices 110a-n (collectively "110"), memory 112a-n (collectively "112"), and BMC 104, in one embodiment, are part of an electronic device. In another embodiment, the electronic device includes the first stage 116, capacitor 118 and DC bus 122. In other embodiments, the electronic device includes VRDs (e.g. 106a1 and possibly more VRDs), but may include other components instead of a CPU, such as a programmable hardware device, like a field programmable gate-array ("FPGA") device, programmable array logic, programmable logic devices, hardware circuits, chips, etc. where the VRDs 106 provide power to the components of the electronic device.

An electronic device in the system 100 includes an update apparatus 102 capable of receiving and updating firmware for the VRDs 106. Firmware is a type of software that provides control, monitoring, and other essential functions in an electronic device. Typically, firmware is installed during a manufacturing process and resides in non-volatile memory within the electronic device. Often, firmware is designed to not change during the lifetime of the electronic device and is typically changed only occasionally, for example to fix a software bug. Often, a firmware update takes place during a power-up condition or another situation where the electronic device is not fully functional. Installing new firmware may require flashing a memory location holding the firmware. With advances in flash memory, in other embodiments, the firmware may be installed while the electronic device is operating or in a paused or suspended condition.

The VRD firmware includes settings that serve to configure and control the VRDs 106. The update apparatus 102 determines external factors and selects new firmware based on the external factors and then replaces previously installed firmware on one or more of the VRDs 106 of the electronic device with the selected new firmware so that settings of the VRDs 106 will be appropriate for the external factors. The update apparatus 102 will be discussed further with regard to the apparatuses 200, 300 of FIGS. 2 and 3.

In one embodiment, the system 100 includes one or more VRDs 106a1, 106b1, . . . 106n1 that include more than one output voltage (e.g. V1, V2, etc.). Often a VRD (e.g. 106a1) includes multiple outputs where each output includes a different voltage. The system 100 may include one multi-output VRD per CPU (e.g. VRD 1-1 106a1 for CPU 1 108a, VRD 1-2 106b1 for CPU 2 108b, . . . VRD 2-n 106 and for CPU n 108n). In another embodiment, the system 100 includes multiple VRDs 106, each with a different output voltage (e.g. VRD 1-1 106a1 with output voltage V1, VRD 2-1 106a2 with output voltage V2, etc.). In another embodiment, the system 100 includes VRDs (e.g. VRD 1-1 106a1, VRD 1-2 106ab, . . . VRD 1-n 106nn) with multiple output voltages (e.g. V1 and V2) and other VRDs (e.g. VRD 2-1 106b1, . . . VRD n-1 106 n1, . . . VRD 2-n 106bn . . . VRD n-n 106nn) with one output voltage (e.g. V3 and V4).

Each VRD 106 is typically a DC-to-DC converter that is a switchmode power supply. Typically, a switchmode power supply includes one or more switches that operate between an open and a closed position to connect or disconnect a voltage source, an inductor, etc. Typically, a switchmode power supply includes at least switches, one or more inductive components, and one or more capacitors. In addition, some switchmode power supplies include one or more rectifiers or equivalent device. A switchmode power converter may be derived from a particular topology, such as a buck topology, a boost topology, a Cúk topology, or other topology, which may be derived from a buck topology, a boost topology, etc. A switchmode power converter may be a resonant topology and may include features, such as zero-voltage switching or other technique to improve efficiency.

A switchmode power converter may have a fixed duty cycle at a particular switching frequency or may have a variable switching frequency, for example with a fixed on-time and a variable off time. Other switchmode power converters may have switches that operate during a particular phase of a switching frequency, which may be called a conduction angle.

Switchmode power converters may also have various control techniques, such as controlling output voltage or output current. Other control techniques change switching modes under different conditions, such as for various loading conditions. Other control techniques may change feedback loop parameters for various conditions. One of skill in the art will recognize that there are many possible control techniques that vary switching conditions, setpoint voltages, and the like for various operating conditions where each control technique may offer a different efficiency characteristic for various operating conditions.

A VRD 106 may include multiple switchmode power converters in parallel where each switchmode power converter may be called "phase" so that the VRD 106 is a multiphase VRD 106. Typically, multiphase VRDs 106 includes phases in parallel and the phases may be selected or deselected. A deselected phase stops switching to not produce any power where a selected phase continues switching and provides power to an output.

The system 100 includes a BMC 104 that, in one embodiment, includes the update apparatus 102. In other embodiments, all or part of the update apparatus 102 may be located elsewhere within or external to the electronic device. For example, a portion of the update apparatus 102 that determines the external factors and/or selects appropriate new firmware may be located external to the electronic device. A BMC 104 may include an FPGA or similar lower level processor or may include a higher level processor, such as a CPU.

Typically, the BMC 104 acts as a controller to monitor the physical state of the electronic device, to monitor sensors related to the electronic device, to communicate with an external computing device 126 over a computer network 124, and to communicate with and controlling various components of the electronic device, such as the VRDs 106, CPUs 108, etc., Often the load of the BMC 104 is fairly constant and may not vary as much as for other components of the electronic device. A VRD 106x serving the BMC 104 may not need to be updated to improve efficiency of the electronic device, but in some embodiments may also receive new firmware from the update apparatus 102.

The BMC 104 is typically connected to the VRDs 106 and other devices using some type of management bus 114. The management bus 114 may be a serial bus, an Inter-Integrated Circuit ("I2C") bus, a Serial Peripheral ("SPI") bus, a Controller Area Network ("CAN") bus, an ACCESS.bus, a System Management Bus ("SMBus"), a Power Management Bus ("PMBus"), an Intelligent Platform Management Bus ("IPMB"), or the like. The management bus 114 may be used to load new firmware onto one or more VRDs 106 of the electronic device.

The electronic device is configurable with various components and/or different numbers of the same component. For example, the electronic device may include a printed circuit board with sockets, connectors, bays, etc. for the various components. For example, the electronic device may come with a single CPU (e.g. CPU 1 108a) and may include sockets for one or more additional CPUs 108. The electronic device may also include other components powered directly by the VRDs 106 or through other components by the VRDs 106 of the electronic device.

The electronic device may also be configured for expansion to include additional memory 112, other peripheral devices 110, non-volatile storage devices, etc. The components, such as memory 112, may be internal to the electronic device through an internal bus, such as a front-side bus, or other internal bus type. The components may also be connected through a computer bus, such as a Universal Serial Bus ("USB"), a Serial AT Attachment ("Serial ATA" or "SATA") bus, a Parallel ATA bus, a Peripheral Component Interconnect ("PCI") bus, a PCI Express ("PCIe") bus, non-volatile memory express ("NVM Express" or "NVMe"), a storage area network ("SAN"), and the like, either internally or externally. Components, such as hard disk drives ("HDD"), solid state drives ("SSD"), non-volatile memory ("NVM"), etc. may be internal or external to the electronic device and may receive power from the VRDs 106. Likewise, other peripheral devices 110 used to get information into or out of the electronic device, such as a keyboard, a mouse, a speaker, a monitor, etc. may draw power from the VRDs 106 of the electronic device.

The system 100 may also include a first stage 116 that conditions incoming power from a voltage source 120, which may be AC or DC power. The VRDs 106, in one embodiment are second stages to the first stage 116 with a DC bus 122 between the first stage 116 and the VRDs 106. The DC bus 122 may include one or more capacitors 118, which may stabilize voltage of the DC bus 122 and may also form a portion of a low pass filter that may service to filter out some switching frequencies. Often the first stage 116 includes a rectifier stage when the voltage source 120 provides AC power where the rectifier stage rectifies the AC voltage. The first stage 116 may also include one or more inductors along with the capacitor(s) 118, which may form a low pass filter to filter out the fundamental frequency of the voltage source 120.

In other embodiments, the first stage 116 is an active stage with switching components. The active stage may be a switchmode converter of some type. For example, the first stage 116 may include an active power factor correction stage that serves to correct power factor, remove harmonics, etc. of the electronic device as seen from the voltage source 120. In another embodiment, the first stage 116 includes an active stage that changes a DC input voltage, either from the voltage source 120 or from a rectifier stage to a desired voltage of the DC bus 122. For example, the voltage source 120 may provide 48 volts ("V") and the DC bus 122 voltage may be 12 V, so an active stage in the first stage 116 may convert 48 V to 12 V. In one embodiment, a VRD 106 provides power to components of the first stage 116. One of skill in the art will recognize other configurations of the first stage 116.

A computing device 126 and a computer network 124, in one embodiment, are part of the system 100. In another embodiment, the computing device 126 and/or the computer network 124 are connected to the system 100, but are not part of the system 100. The computing device 126, for example, may be a client, a computer of a system administrator, etc. The computing device 126, in one embodiment, is connected to the BMC 104 and may be a source for VRD firmware configurations. The computing device 126 may transmit one or more VRD firmware configurations to the BMC 104 for distribution to the VRDs 106.

The computer network 124 may be local area network ("LAN"), a wide area network ("WAN"), may include the Internet, may include a wireless connection, may include a storage area network ("SAN"), or the like. The computer network 124, in one embodiment, includes cables, switches, routers, etc. that are typically part of a computer network 124. In one embodiment, the computer network 124 includes more than one network. For example, the computer network 124 may include a LAN from the BMC 104 which is connected to the Internet, which is connected to another LAN connecting the computing device 126.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The system 100, in one embodiment, is embodied by a computing device that includes the VRDs 106, the BMC 104, the CPUs 108, the peripheral devices 110, the memory 112, the first stage 116, etc. In another embodiment, the system 100 is embodied by multiple components in a computer rack that may include blade servers, a backplane, a rack-mounted power device with the first stage 116, etc.

The system 100, in one embodiment, is located in a data center. The data center may include any facility that houses the electronic device. The data center typically includes some form of heating, ventilating and air conditioning ("HVAC") equipment to keep at least the exterior of the electronic device within a desired temperature range. The data center may also include specific cooling for the electronic device, such as cooling of rack-mounted devices, fans, liquid cooling, and the like. A rule of thumb is that for every watt of energy used by an electronic device, another watt of cooling may be required for cooling the space around the electronic device so that where the electronic system operates more efficiently, power for cooling may be reduced.

Figure 2:
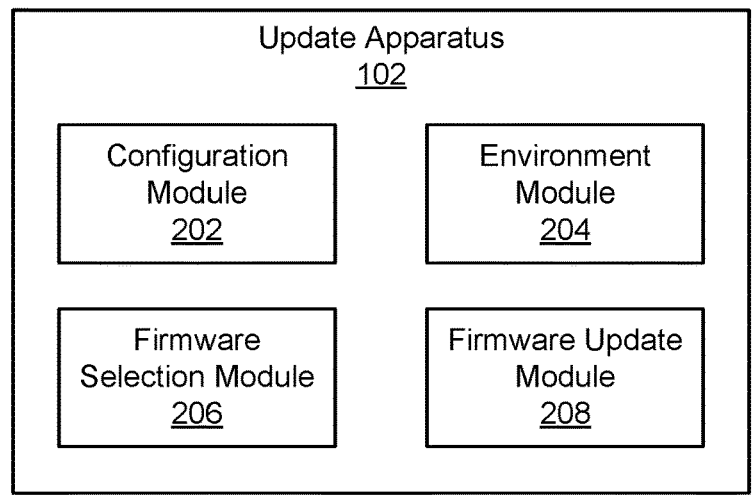
FIG. 2 is a schematic block diagram illustrating one embodiment of an apparatus for voltage regulation device adjustment.

FIG. 2 is a schematic block diagram illustrating one embodiment of an apparatus 200 for voltage regulation device adjustment. The apparatus 200 includes one embodiment of the update apparatus 102, which includes a configuration module 202, an environment module 204, a firmware selection module 206 and a firmware update module 208, which are described below.

The apparatus 200 includes a configuration module 202 that determines a configuration of the electronic device, where determining the configuration includes determining which components are installed and information about the installed components. The electronic device includes one or more VRDs 106 providing power to one or more of the components of the electronic device.

In one embodiment, the components of the electronic device include a particular component type and the components may include a CPU 108, a programmable hardware device, a memory device 112, a non-volatile storage device, a peripheral device 110, a computer bus connected device, and the like. In another embodiment, determining the configuration of the electronic device includes determining a model number of a component and information relating to the model of the component. For example, a CPU 108 may range from 80 watts ("W") to 200 W so that each CPU model is capable of using a different amount of power and each CPU type may require a different VRD firmware configuration.

The configuration module 202 may determine which components are installed and which component sockets, bays, cables, etc. are empty, not connected, etc. In addition, for installed components, the configuration module 202 may determine a model number and corresponding performance information so that the firmware selection module 206 may select appropriate VRD firmware for the particular configuration. The configuration module 202 is similar to the configuration module 304 in U.S. patent application Ser. No. 15/295,848 filed Oct. 17 2016, titled "Adjustment of Voltage Regulator Firmware Settings Based Upon External Factors," for Luke Remis, et al. [hereinafter "the External Factors Application"], which is incorporated herein by reference for all purposes.

The apparatus 200 includes an environment module 204 that measures one or more environmental variables relating to an operating environment of the electronic device. For example, the environment module 204 may measure one or more temperatures within the electronic device. For example, the environment module 204 may measure temperature of a CPU 108, temperature of memory 112, temperature of a peripheral device 110, or temperature of another component in the electronic device. In another embodiment, the environment module 204 measures ambient temperature within the electronic device. For example, the environment module 204 may measure temperature of the air inside the electronic device.

In one embodiment, the environment module 204 measures air velocity and/or air flow within the electronic device. For example, the environment module 204 may measure air velocity or flow caused by a fan of a VRD 106. In another example, the environment module 204 may measure air flow or velocity of a fan providing general air flow within the electronic device. In another embodiment, the environment module 204 measures humidity within the electronic device. In one embodiment, the environment module 204 receives measurements from the components or other equipment monitoring environmental variables. In another embodiment, the environment module 204 includes equipment for measurement of the environmental variables, such as thermocouples, thermometers, etc. One of skill in the art will recognize other environmental variables for the environment module 204 to measure.

The apparatus 200 includes a firmware selection module 206 that selects new firmware for one or more VRDs 106 of the electronic device in response to the determined configuration and measured environmental variables. For example, the firmware selection module 206 may determine that the configuration includes empty sockets, drive bays, etc. so that the electronic device is incapable of using power from the VRDs 106 equal to the ratings of the VRDs 106. If the installed VRD firmware is the original VRD firmware installed by the manufacturer, the VRD firmware may then be set for worst case power consumption.

For example, multiphase VRDs 106 may have all phases selected. In addition, VRDs 106 may be providing power for empty CPU slots, empty memory slots, etc. The firmware selection module 206 may select new firmware that accounts for missing components. For example, the VRD firmware may deactivate VRDs 106 serving empty sockets or may deselect phases of a multi-phase VRD 106 where the multiphase VRD 106 is serving less components than a fully populated configuration.

Likewise, the firmware selection module 206 may select new firmware for the VRDs 106 based on components that have a lower power usage than a rated usage for a socket or slot. For example, where a CPU socket is rated for 200 W, a CPU 108 may be installed that is rated for only 100 W so that the VRDs 106 serving the CPU 108 may be originally configured to provide more power than the CPU 108 is capable of using. The firmware selection module 206 may select VRD firmware that deselects some phases of a multiphase VRD 106 so that the operating phases are running more efficiently.

The firmware selection module 206 may also take into account the measured environmental variables when selecting new firmware. For example, the previously installed firmware may be set for CPUs 108 and other components running near a maximum temperature. The environment module 204 may determine that actual running temperatures of the components are less than the maximum rated temperatures so the firmware selection module 206 may select firmware that accounts for components running cooler than maximum temperatures. The electronic device may then run fans at a lower speed, thus consuming less power. The firmware selection module 206 may select firmware for VRDs 106 providing power to fans that account for less fan power consumption.

The firmware selection module 206 may select new firmware that results in higher efficiency of the VRDs 106 in relation to current efficiency of the VRDs 106 using previously installed VRD firmware. The firmware selection module 206, in one embodiment, may use a table, a database, etc. that includes performance characteristics of various VRD firmware based on various combinations of external factors. In one embodiment, the firmware selection module 206 includes formulas, algorithms, tables, energy rates, etc. to make use of the determined configuration and measured environmental variables to determine which new firmware to select for the VRDs 106.

In one embodiment, each firmware configuration adjusts settings within the VRDs 106. For example, the settings within the VRDs 106 include an output voltage setpoint, a current setpoint, a control parameter, a parameter of a component within the VRDs 106, and/or a switching parameter, such as maximum duty cycle, conduction angle limits, etc. The settings within the VRDs 106 may include any VRD setting, such as those described above. In another embodiment, the settings within the VRDs 106 include selection or deselection of one or more phases of the VRDs 106 for operation. As described above, the one or more phases of a VRD 106 include switchmode power converters connected in parallel, where each switchmode power converter provides power from the VRD when selected.

In one embodiment, the firmware selection module 206 selects different firmware for different VRDs 106. For example, the firmware selection module 206 may account for loading or other condition on each CPU 108 and may select different firmware for the VRDs 106 of each CPU 108. In another embodiment, the firmware selection module 206 selects firmware for a VRD 106 based on the configuration of the VRD 106. For example, the firmware for a multiphase and/or multi-output VRD (e.g. VRD 1-1 106a1) may differ from single output or single phase VRDs (e.g. VRD 2-1 106b1).

The apparatus 200 includes a firmware update module 208 that replaces previously installed firmware on one or more of the VRDs 106 with the new firmware, where the new firmware includes control settings for the VRDs 106. The new firmware installed by the firmware update module 208 is the new firmware selected by the firmware selection module 206. In one embodiment, the previously installed firmware includes firmware installed by a manufacturer before the electronic device was shipped from the manufacturer. In another embodiment, the previously installed firmware was installed at a time after shipping from the manufacturer. For example, the previously installed firmware may be for a determined configuration and/or measured environmental variables different than a current configuration or current environmental variables determined by the configuration module 202 and/or the environment module 204.

In one embodiment, the firmware update module 208 replaces the previously installed firmware at a power on condition, for example, when the electronic device is started. In another embodiment, the firmware for each VRD 106 is hot-swappable and may be installed while the VRDs 106 and other components of the electronic device are operating. In another embodiment, the firmware update module 208 installs two or more VRD firmware configurations at one time, for example, where the firmware selection module 206 selects multiple VRD firmware conversions for a single installation.

Figure 3:
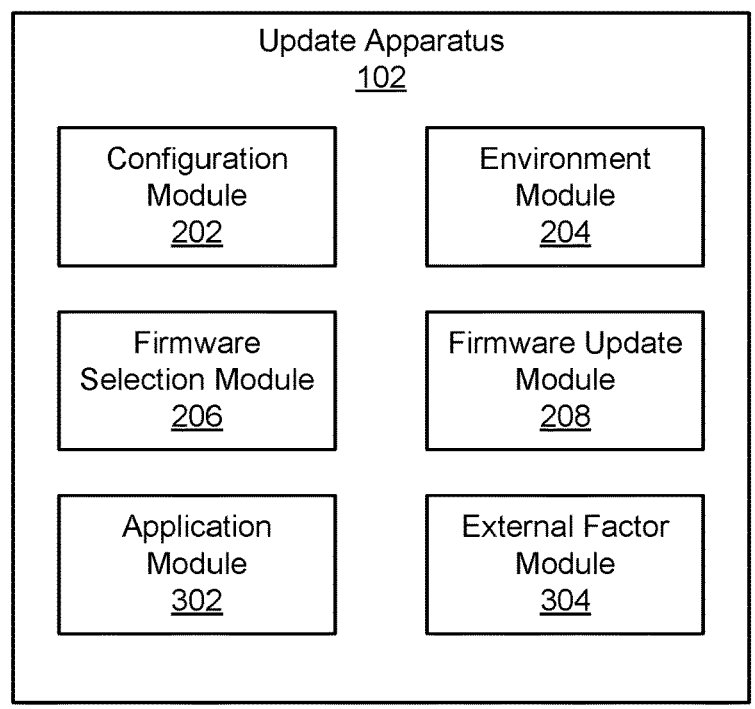
FIG. 3 is a schematic block diagram illustrating another embodiment of an apparatus for voltage regulation device adjustment.

FIG. 3 is a schematic block diagram illustrating another embodiment of an apparatus 300 for voltage regulation device adjustment. The apparatus 300 includes another embodiment of the update apparatus 102 with a configuration module 202, an environment module 204, a firmware selection module 206 and a firmware update module 208, which are substantially similar to those described above in relation to the apparatus 200 of FIG. 2. In various embodiments, the apparatus 300 includes an application module 302 and an external factor module 304, which are described below.

The apparatus 300 includes, in some embodiments, an application module 302 that determines an application running on the electronic device and one or more effects of the application on one or more components of the electronic device. The firmware selection module 206 selects the new firmware in response to the determined external factors and the effects of the application on the one or more components of the electronic device. For example, the application module 302 may interface with the CPUs 108, the BMC 104 and/or the computing device 126 to determine which applications are running on the various CPUs 108 and the effects of the applications on the various components of the electronic device.

In another example, a particular application may use around 50% of the capacity of a CPU 108 while another application may use 90% of the capacity of the CPU 108. Using 90% of the capacity of the CPU 108 may use more power than using 50% of the capacity of the CPU 108. In addition, some applications may be memory intensive, peripheral intensive, etc. so that an application may affect memory 112, peripheral devices 110, etc. in different ways, which affects power consumption. The application module 302 takes into account which applications are running or will run during a time period along with the effects of the application(s).

The apparatus 300, in some embodiments, includes an external factor module 304 that determines external factors. The external factors are conditions external to the electronic device that affect operating performance and operating costs. As stated above, the electronic device includes one or more VRDs 106 that provide power to one or more components of the electronic device.

In one embodiment, the external factors include an energy cost. For example, the energy cost may be an electrical cost charged by an electrical utility providing power to the electronic device. In another embodiment, the energy costs vary over time. For example, the energy costs may vary in a 24-hour period, may vary based on a particular day of the week, may vary seasonally, may vary based on weather conditions, etc. In one embodiment, the energy cost is an electrical rate.

In another embodiment, the energy cost is another rate that affects electrical power to the electronic device. For example, the energy cost may include a cost for natural gas where the natural gas is used in maintaining an ambient temperature surrounding the electronic device within a particular range or at a particular temperature. In another embodiment, the energy cost is a composite cost of more than one energy source, such as electrical costs from a utility and natural gas costs. The external factor module 304, in one embodiment, has energy costs stored in a table, a database, etc. in another embodiment, the external factor module 304 receives external cost information over the computer network 124.

In another embodiment, an external factor is temperature external to a data facility housing the electronic device. In another embodiment, an external factor is humidity external to the data center. For example, the external factor module 304 may receive temperature information from a thermometer and/or humidity information from a hygrometer external to a data center housing the electronic device. In another embodiment, the external factor module 304 includes a thermometer and/or a hygrometer that are not part of the data center, for example, from a nearby weather station. In another embodiment, the external factor module 304 receives temperature and/or humidity information from a weather service, from a weather station, etc. over the computer network 124.

In another embodiment, an external factor is time of day, which may be used to determine a particular energy rate at a particular time, may be used to determine daylight conditions, and the like. In one embodiment, the external factor module 304 includes a clock function within the electronic device. In another embodiment, the external factor module 304 receives time of day information from another source, such as from the computer network 124, from a CPU 108, from the BMC 104, etc.

In another embodiment, an external factor includes sunlight conditions. For example, the external factor module 304 may determine sunlight conditions as a function of time of day, latitude of the data center, longitude of the data center, etc. In another embodiment, the external factor module 304 may deduce sunlight conditions from a weather forecast. In another embodiment, the external factor module 304 may determine sunlight conditions based on direct measurement at a location external to the data center where the external factor module 304 take into account cloud cover, haze, etc. in addition to sun inclination in the sky. Sunlight conditions typically affect HVAC costs and may be useful in determining VRD firmware. In other embodiments, the external factor module 304 gathers other weather data, such as wind speed, precipitation, etc.

In another embodiment, an external factor is ambient temperature external to the electronic device within the data center. For example, the external factor module 304 may receive temperature information from a thermometer, thermocouple, etc. within the data center and external to the electronic device. The ambient temperature may be measured close to the electronic device or at a location within the data center that is not close to the electronic device, such as at a thermostat for controlling heating and cooling in the data center. In another embodiment, the external factor module 304 includes a thermometer, thermocouple, or the like for temperature measurement.

In one embodiment, the external factor module 304 gathers two or more external factors for use in determining new VRD firmware. In another embodiment, the external factor module 304 and/or the firmware selection module 206 may use tables, formulas, algorithms, and the like to determine the effects of the external factors on the electronic device and/or VRDs 106.

In one embodiment, the external factors include a desired performance characteristic of the electronic device in relation to energy usage. Typically, higher performance of the electronic device requires more power than lower performance. The external factor module 304 may receive a performance characteristic as an external factor. The performance characteristic may include a number on a scale, a binary selection, a set of parameters, or other performance characteristics that may be used to determine a desired performance. For example, a system administrator, an algorithm, etc. may select a higher performance characteristic when energy costs are relatively low and a lower performance characteristic when energy costs are high. In one instance, where time-based energy costs dictate a higher electrical cost during particular hours of the day, a performance characteristic may be for lower performance than other hours of the day when energy costs are lower. The external factor module 304 is similar to the external factor module 202 of the External Factors Application.

Figure 4:
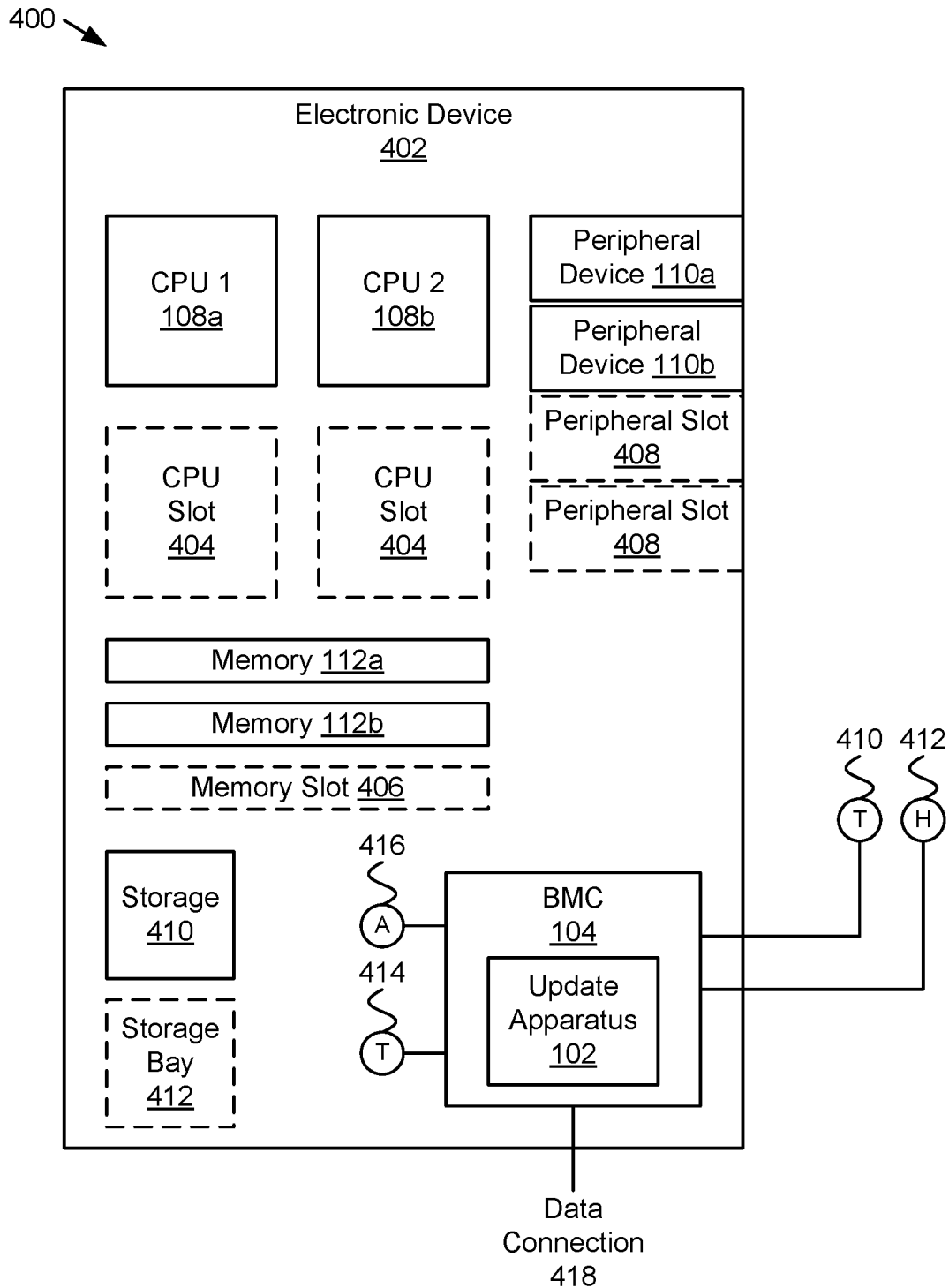
FIG. 4 is a schematic block diagram illustrating one embodiment of an electronic device and an update apparatus.

FIG. 4 is a schematic block diagram 400 illustrating one embodiment of an electronic device 402 and an update apparatus 102. The diagram 400 includes an update apparatus 102 in a BMC 104 in an electronic device 402. The electronic device 402 includes two CPUs (e.g. CPU 1 108*a* and CPU 2 108*b*) and two CPU slots 404. The electronic device 402 is capable of handling four CPUs 108, but only has two installed, which affects power supplied by the VRDs 106. The electronic device 402 also includes two memory devices 112*a*, 112*b* and an empty memory slot 406. Again, less memory may require less power directed specifically to memory 112. However, less memory 112 may also cause the CPUs 108*a*, 108*b* to operate less efficiently in some conditions, which may require more power. The environment module 204, the application module 302, etc. may determine the effects of an empty memory slot 406. The electronic device 402 also includes two peripheral devices 110*a*, 110*b* and two empty peripheral device slots or bays 408, which again affect power consumption compared to a fully populated electronic device 402. The configuration module 202 may determine which slots, bays, etc. are empty and may also determine model numbers for occupies slots and bays and may then gather information about the installed components.

The diagram 400 also depicts an external thermometer 410 for ambient temperature measurement outside the electronic device 402 and an external hygrometer 412 for measuring humidity outside the electronic device 402. Also, an internal thermometer 414 determines temperature internal to the electronic device and an airflow meter 416 determines air flow and/or air velocity in the electronic device. 402. While a single internal thermometer 414 is depicted, other thermometers, thermocouples, etc. may be used to measure environmental variables, such as component temperature. The various components of the electronic device 402 may also report temperature and other operating conditions to the environment module 204. In addition, the environment module 204 may use information from the external thermometer 410 and hygrometer 412.

The diagram 400 includes a data connection 418 that extends beyond the electronic device 402. For example, the data connection may be the computer network 124 depicted in FIG. 1. The data connection 418 may be used by the configuration module 202 to receive information about installed components, may be used by the firmware selection module 206, the firmware update module 208 to receive new firmware, firmware information, etc., the application module 302 to get application information, etc. One of skill in the art will recognize other useful environmental variables to measure.

Figure 5:
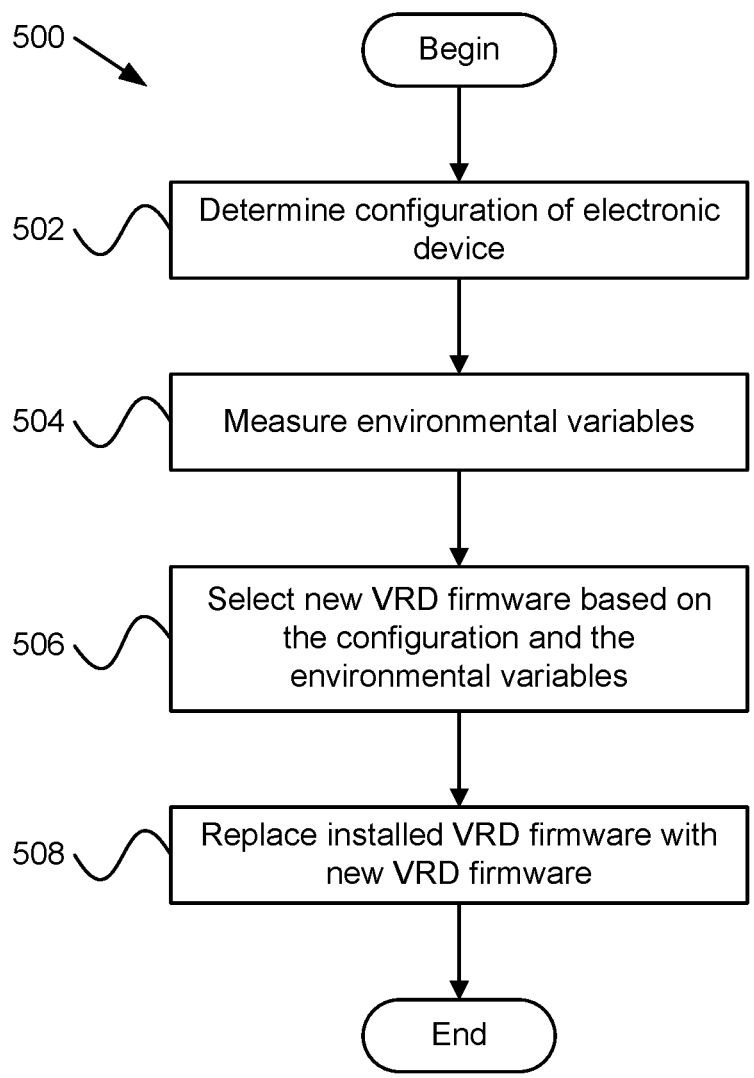
FIG. 5 is a schematic flow chart diagram illustrating one embodiment of a method for voltage regulation device adjustment.

FIG. 5 is a schematic flow chart diagram illustrating one embodiment of a method 500 for voltage regulation device adjustment. The method 500 begins and determines 502 a configuration of the electronic device 402, where determining 502 the configuration includes determining which components are installed and information about the installed components. The configuration module 202 may determine 502 the configuration of the electronic device 402. The method 500 measures 504 one or more environmental variables relating to an operating environment of the electronic device 402. For example, the environment module 204 may measure 504 the environmental variables.

The method 500 selects 506 new firmware for the one or more VRDs 106 of the electronic device 402 in response to the determined configuration and measured environmental variables and replaces 508 previously installed firmware on one or more of the VRDs 106 with the new firmware, and the method 500 ends. The new firmware includes control settings for the VRDs 106. In some embodiments, the firmware selection module 206 selects 506 the new firmware and/or the firmware selection module 208 replaces 508 the previously installed firmware with the new firmware.

Figure 6:
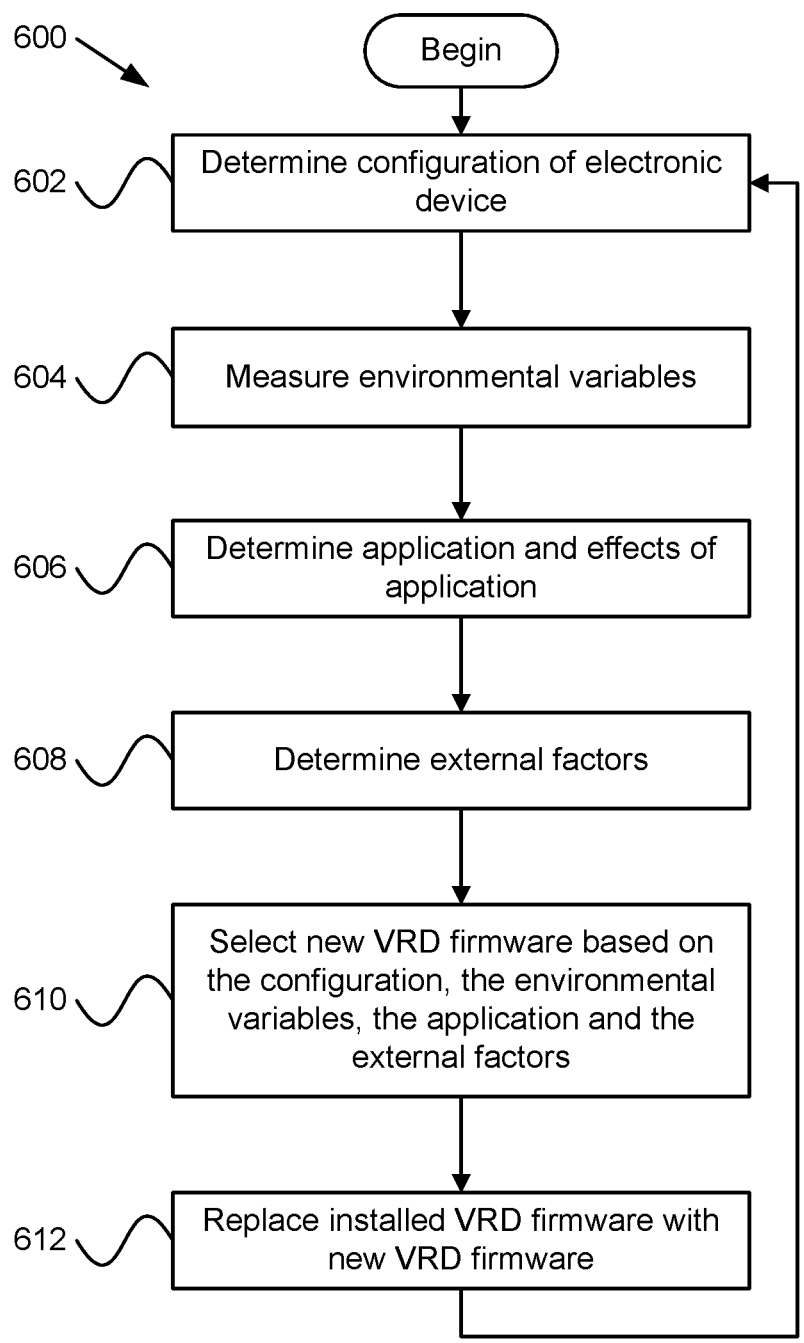
FIG. 6 is a schematic flow chart diagram illustrating another embodiment of a method for voltage regulation device adjustment.

FIG. 6 is a schematic flow chart diagram illustrating another embodiment of a method 600 for voltage regulation device adjustment. The method 600 begins and determines 602 a configuration of the electronic device 402, where determining 602 the configuration includes determining which components are installed and information about the installed components. The configuration module 202 may determine 602 the configuration of the electronic device 402. The method 600 measures 604 one or more environmental variables relating to an operating environment of the electronic device 402. For example, the environment module 204 may measure 604 the environmental variables.

In one embodiment, the method 600 determines 606 an application running on the electronic device 402 and one or more effects of the application on one or more components of the electronic device 402. In another embodiment, the method 600 determines 608 external factors, where the external factors include conditions external to an electronic device 402 that affect operating performance and operating costs. In the embodiments, the method 600 may use the application module 302 and the external factor module 304.

The method 600 selects 610 new firmware for the VRDs 106 of the electronic device 402 in response to the determined external factors, the determined applications running on the electronic device 402, the determined configuration of the electronic device 402 and/or the environmental variables of the electronic device 402. The method 600 replaces 612 previously installed firmware on the VRDs 106 with the new firmware, and the method 600 returns to determine 602 the configuration of the electronic device 402. For example, the method 600 may periodically determine 602 the configuration, measure environmental variables, etc. The new firmware includes control settings for the VRDs 106. In some embodiments, the firmware selection module 206 selects 610 the new firmware and the firmware update module 208 replaces 616 the previously installed firmware with the new firmware.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a configuration module that determines a configuration of an electronic device, wherein determining the configuration comprises determining which components are installed and information about the installed components, the electronic device comprising a voltage regulator device ("VRD") providing power to one or more of the components;
 an environment module that measures one or more environmental variables relating to an operating environment of the electronic device;
 a firmware selection module that selects new firmware for the VRD of the electronic device in response to the determined configuration and measured environmental variables; and
 a firmware update module that replaces previously installed firmware on the VRD with the new firmware, wherein the new firmware comprises control settings for the VRD.

2. The apparatus of claim 1, wherein the components of the electronic device comprise one or more of a particular component and the components comprise one or more of a central processing unit ("CPU"), a programmable hardware device, a memory device, a non-volatile storage device, a peripheral device, and a computer bus connected device.

3. The apparatus of claim 1, wherein determining the configuration of the electronic device comprises determining a model number of a component and information relating to the model of the component.

4. The apparatus of claim 1, wherein the one or more environmental variables comprise one or more of temperature of a component, ambient temperature within the electronic device, ambient temperature external to the electronic device, humidity, and air velocity through the electronic device.

5. The apparatus of claim 1, further comprising an application module that determines an application running on the electronic device and one or more effects of the application on the one or more components of the electronic device.

6. The apparatus of claim 1, wherein the previously installed firmware on the VRD comprises firmware installed prior to shipment from a manufacturer.

7. The apparatus of claim 1, wherein the new firmware adjusts settings within the VRD.

8. The apparatus of claim 7, wherein the settings within the VRD comprise one or more of an output voltage setpoint, a current setpoint, a control parameter, a parameter of a component within the VRD, and a switching parameter.

9. The apparatus of claim 7, wherein the settings within the VRD comprise selection of one or more phases of the VRD for operation, wherein the one or more phases comprise power units connected in parallel, wherein each power unit provides power from the VRD when selected.

10. The apparatus of claim 1, wherein the VRD is connected to a management bus and receives the new firmware over the new firmware over the management bus.

11. The apparatus of claim 10, wherein the management bus is connected to a baseboard management controller ("BMC") associated with the electronic device.

12. The apparatus of claim 11, wherein the BMC is connected to a computer network external to the electronic device and the BMC receives VRD firmware information over the computer network.

13. The apparatus of claim 10, wherein the management bus comprises one of a serial bus, an Inter-Integrated Circuit ("I²C") bus, a Serial Peripheral ("SPI") bus, a Controller Area Network ("CAN") bus, an ACCESS.bus, a System Management Bus ("SMBus"), a Power Management Bus ("PMBus"), and an Intelligent Platform Management Bus ("IPMB").

14. The apparatus of claim 1, further comprising the electronic device.

15. A method comprising:
 determining a configuration of an electronic device, wherein determining the configuration comprises determining which components are installed and information about the installed components, the electronic device comprising a voltage regulator device ("VRD") providing power to one or more of the components;
 measuring one or more environmental variables relating to an operating environment of the electronic device;
 selecting new firmware for the VRD of the electronic device in response to the determined configuration and measured environmental variables; and
 replacing previously installed firmware on the VRD with the new firmware, wherein the new firmware comprises control settings for the VRD.

16. The method of claim 15, further comprising determining an application running on the electronic device and one or more effects of the application on the one or more components of the electronic device.

17. The method of claim 15, wherein the components of the electronic device comprise one or more of a particular component and the components comprise one or more of a central processing unit ("CPU"), a programmable hardware device, a memory device, a non-volatile storage device, a peripheral device, and a computer bus connected device and wherein determining the configuration of the electronic device comprises determining a model number of a component and information relating to the model of the component.

18. The method of claim 15, wherein the one or more environmental variables comprise one or more of temperature of a component, ambient temperature within the electronic device, ambient temperature external to the electronic device, humidity, and air velocity through the electronic device.

19. The method of claim 15, wherein the new firmware adjusts settings within the VRD, the settings within the VRD comprise one or more of an output voltage setpoint, a current setpoint, a parameter of a component within the VRD, a switching parameter, and selection of one or more phases of the VRD for operation, wherein the one or more phases comprise power units connected in parallel, wherein each power unit provides power from the VRD when selected.

20. A computer program product comprising a non-transitory computer readable storage medium having program instructions embodied therewith, the program instructions executable by a processor to cause the processor to:
   determine a configuration of an electronic device, wherein determining the configuration comprises determining which components are installed and information about the installed components, the electronic device comprising a voltage regulator device ("VRD") providing power to one or more of the components;
   measure one or more environmental variables relating to an operating environment of the electronic device;
   select new firmware for the VRD of the electronic device in response to the determined configuration and measured environmental variables; and
   replace previously installed firmware on the VRD with the new firmware, wherein the new firmware comprises control settings for the VRD.

* * * * *